United States Patent [19]

Dursch et al.

[11] Patent Number: 5,077,106

[45] Date of Patent: Dec. 31, 1991

[54] CONVOLUTELY LINED AND WRAPPED COMPOSITE TUBES

[75] Inventors: Harry W. Dursch, Seattle; Donald A. Anderson, Renton; Robert F. Collins, Ravensdale, all of Wash.

[73] Assignee: The Boeing Company, Seattle, Wash.

[21] Appl. No.: 416,650

[22] Filed: Oct. 3, 1989

Related U.S. Application Data

[62] Division of Ser. No. 183,680, Apr. 19, 1988, Pat. No. 4,900,383.

[51] Int. Cl.⁵ .......................... F16L 9/16; D03D 35/00
[52] U.S. Cl. ..................................... 428/35.9; 138/140
[58] Field of Search ............... 138/109, 178, 141, 153, 138/140, 142, 143, 156; 427/44; 428/36, 294, 398, 35.8, 35.9, 36.9, 36.91

[56] References Cited

U.S. PATENT DOCUMENTS

| | | | |
|---|---|---|---|
| 2,512,900 | 6/1950 | Kwitek | 242/56.6 |
| 2,858,854 | 11/1958 | Daggett | 138/56 |
| 2,861,598 | 11/1958 | Carder, Jr. et al. | 138/56 |
| 3,092,530 | 6/1963 | Plummer | 138/151 |
| 3,879,244 | 4/1975 | Varlas | 156/192 |
| 3,899,377 | 8/1975 | Luc | 228/111 |
| 3,911,961 | 10/1975 | Peyton et al. | 138/113 |
| 3,949,896 | 4/1976 | Luc | 220/75 |
| 3,952,937 | 4/1976 | Lamons et al. | 228/110 |
| 4,005,234 | 1/1977 | Stroupe | 428/36 |
| 4,022,248 | 5/1977 | Hepner et al. | 156/215 X |
| 4,081,302 | 3/1978 | Drostholm et al. | 156/190 |
| 4,106,167 | 8/1978 | Luc | 29/33 D |
| 4,173,670 | 11/1979 | Van Auken | 156/53 |
| 4,214,932 | 7/1980 | Van Auken | 156/215 X |
| 4,259,821 | 4/1981 | Bush | 244/158 R |
| 4,579,617 | 4/1986 | Oberg et al. | 156/215 |
| 4,628,150 | 12/1986 | Luc | 174/88 C |
| 4,680,070 | 7/1987 | Hughes | 156/218 |

FOREIGN PATENT DOCUMENTS

| | | | |
|---|---|---|---|
| 607247 | 10/1960 | Canada | 156/187 |
| 56-0060223 | 5/1981 | Japan | 264/258 |
| 57-0181840 | 11/1982 | Japan | 156/130 |

*Primary Examiner*—James J. Seidleck
*Assistant Examiner*—Charles R. Nold
*Attorney, Agent, or Firm*—Christensen, O'Connor, Johnson & Kindness

[57] ABSTRACT

Methods are provided for lining and wrapping both interior and exterior surfaces of tubular structures with materials that protect the underlying structures from adverse environmental conditions, provide a thermal control coating and prevent exchanging moisture with the surrounding environments. The methods use adhesives to securely position the lining or wrapping material inside or around the exterior of the tubular structure. The adhesives prevent the formation of discontinuities in the protective layer provided by the lining or wrapping material by holding the protective materials in place during the fabrication process. The wrapping materials are sealed by an ultrasonically welded seam to prevent environmental attack through the seam to the underlying tubular structure.

20 Claims, 3 Drawing Sheets

CONVOLUTELY LINED AND WRAPPED COMPOSITE TUBES

This is a divisional application of the prior pending application Ser. No. 07/183,680, filed Apr. 19, 1988, now U.S. Pat. No. 4,900,383. The benefit of the filing date of which is hereby claimed under 35 U.S.C. § 120.

BACKGROUND OF THE INVENTION

The present invention relates to methods for convolutely lining and wrapping tubes with protective materials such as metal foils and the tubes prepared by these methods.

Tubular structures have a multitude of applications in a variety of industries as support trusses, piping systems and fluid containers. Certain composite tubular structures are used in applications where environmental factors such as heat, moisture, chemicals, radiation, particle impact and the like can have an adverse effect on the materials imparting structural integrity to the tubular structure. For instance, in order to protect tubular trusses used in the construction of low earth orbit space stations, it is desirable to line and/or wrap the tubular truss with a material that will isolate the underlying materials from low earth orbit environmental conditions, such as atomic oxygen, charged particle radiation, ultraviolet radiation, micrometeoroids and space debris, as well as to prevent moisture absorption/desorption of the tubular truss and provide a passive thermal control coating. Also, by lining and/or wrapping tubular structures, increased strength and rigidity can be imparted to the tubular structure. In other applications that are less technologically oriented, it is desirable to line or wrap tubular structures for aesthetic and decorative purposes.

When lining a tubular structure with a resilient lining material, it is often difficult to fix the lining material in a stationary position as the tubular structure is formed around the lining material. Although resilient lining materials can be formed when subjected to pressure, the resiliency of the material causes it to return to its original shape when the pressure is removed. The inability to fix the lining material often prevents its use or results in a tubular structure that has an uneven or discontinuous lining. These uneven or discontinuous linings do not provide the protective layer that would otherwise be present if the lining material were even and continuous.

Because the exterior of a tubular structure is often exposed to environmental conditions, it is often advantageous to protect the exterior of the tubular structure by wrapping it with a protective material. In order to ensure effective protection of the underlying tubular structure, it is important that the seam that seals the wrapping material to itself be such that it is not susceptible to degradation upon exposure to environmental conditions. Otherwise, the underlying tubular structure may become exposed to the adverse environmental conditions as a result of the failure of the seal. For example, in the specific application of tubular trusses used in the construction of space stations, epoxy resins that are generally used as adhesives are susceptible to degradation by the atomic oxygen environment present in low earth orbital space. After extended exposure to atomic oxygen, the epoxy resin bond begins to decompose and as a consequence the underlying tubular structure is no longer isolated from the low earth orbital environmental conditions.

It has been discovered that the method of the present invention provides uniformly lined tubes that do not suffer from the problems associated with tubes that are lined by conventional means. The lining provides a protective layer that is free of flaws or dicontinuities that could result in the underlying tubular structure being exposed to undesirable environmental factors. The method also provides a wrapped tubular structure that is sealed in a manner that will not result in the failure of the seal, followed by degradation of the underlying tubular structure. The method is economical and does not require complex processing steps or equipment.

SUMMARY OF THE INVENTION

In one embodiment, the present invention is a method for lining a tube with a protective lining material, such as a metal foil. The method is particularly adaptable to those processes that form tubes by wrapping a thermally curable tubing precursor material around a support such as a mandrel. In accordance with the present invention, the first end of the lining material is anchored to the support prior to wrapping the lining material at least once around the support. After the lining material is wrapped around the support, the second end of the lining material is anchored to the lining material; as a consequence, the lining material now surrounds the support. The anchored lining material is then wrapped and surrounded with a tubing precursor material prior to subjecting the support, lining material and tubing precursor material to curing conditions. After the curing process is complete, the support is removed and a uniformly lined tube is provided.

In another embodiment, the present invention is a method of wrapping a tubular structure with a wrapping material, preferably similar to the material used to line the tube. In this method, the first end of the wrapping material is anchored to the tubular structure with an adhesive composition. The wrapping material is then wrapped at least once around the tubular structure before anchoring the wrapping material to the tubular structure near the second end of the wrapping material using the same or a similar adhesive composition that was used to anchor the first end of the wrapping material to the tubular structure. In order to seal the wrapping material around the tubular structure, the overlapping portion of the second end of the wrapping material is ultrasonically welded to the wrapping material in a manner that provides a seal that is not adversely affected by environmental conditions. After the wrapping material and the second end of the wrapping material have been welded together, the adhesive composition is subjected to curing conditions to provide the wrapped tubular structure.

While conventional methods of lining and wrapping tubular structures involve complicated procedures and often provide unevenly or discontinuously lined or wrapped tubes, the method in accordance with the present invention is economical, uncomplicated and easy to apply to a number of tubing systems. The interiors of the tubes may be uniformly lined and the exteriors uniformly wrapped and sealed in a manner that eliminates the likelihood of damage or degradation to the underlying materials making up the tubular structure due to adverse environmental conditions. As a consequence, the tubes have an extended useful life compared to tubes that are not satisfactorily lined or wrapped.

Additionally, the lining and/or wrapping of the tubular structure will increase its strength and rigidity.

Other objects, features, and advantages of the present invention will be readily apparent from the following description of certain preferred embodiments thereof, taken in conjunction with the accompanying drawings. It is understood that variations and modifications may be effected without departing from the spirit and scope of the novel concepts of the disclosure.

DETAILED DESCRIPTION OF THE INVENTION

Figure 1:
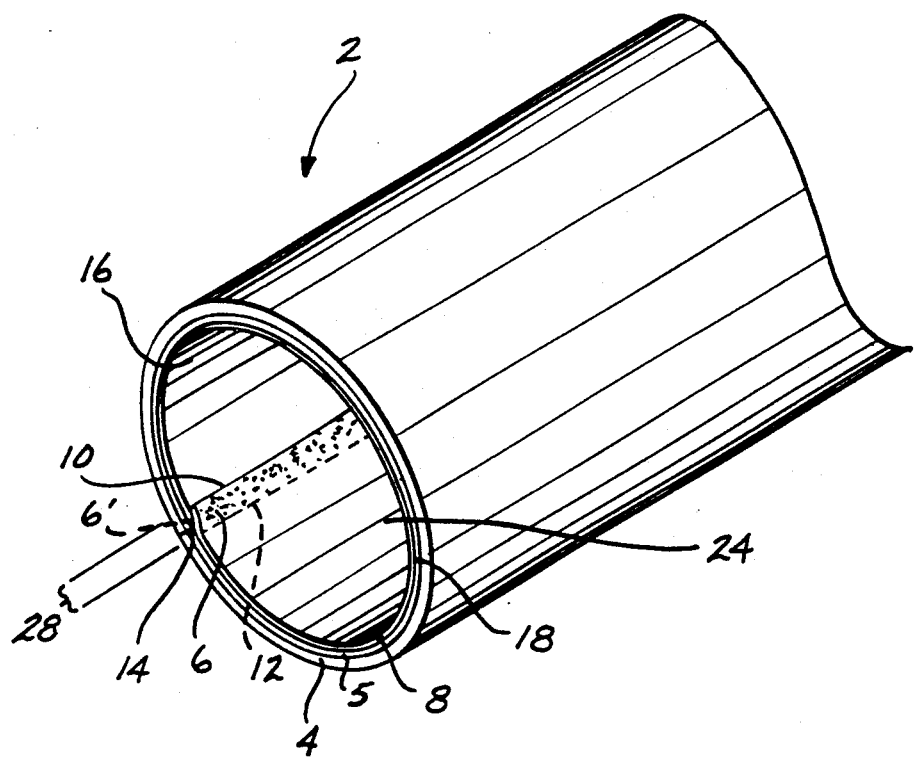
FIG. 1 is an isometric view of a lined tube prepared in accordance with the method of the present invention.

Tubes that are advantageously lined by the method of the present invention include those that are generally formed by wrapping a tubing precursor material around a support, such as a mandrel, that has a shape consistent with the desired shape of the hollow interior of the tube. After the tubing precursor material is wrapped around the support, it is subjected to curing conditions that cause the tubing precursor material to cure and permanently form to the shape of the support. The particular cross-sectional shape of the tube perpendicular to its longitudinal axis is not critical to the present invention; however, circular cross sections have been found to be particularly useful in the method of the present invention. Because it is often advantageous to both line the interior and wrap the exterior surfaces of the tube in order to protect or strengthen the tube, these same tubes can be advantageously wrapped by the method of the present invention. Although the tubes lined by the method of the present invention are the preferred tubular structures to which the method of wrapping a tubular structure is applied, tubular structures that are prepared by other means or even solid structures can be advantageously wrapped in accordance with the method of the present invention. A particularly preferred method of producing a lined and wrapped tube employs a combination of the lining and wrapping methods disclosed herein. Prior to subjecting the lined tubing precursor material to curing conditions that cause the tubing precursor material to permanently take on the shape of the support, the tube is wrapped in accordance with the present invention and then subjected to curing conditions, thus providing a tube that is both lined and wrapped in a single process.

In the particular application of tubular trusses to be used in low earth orbit environments, it is advantageous to line the interior of the truss in order to isolate the underlying tubing precursor material from the low earth orbit environment. Although the interior of the truss is generally isolated from environmental conditions by sealing the open ends of the truss, it is possible that flaws or failure of the seal or puncturing of the truss surface could result in exposure of the truss interior to low earth orbit environment. This exposure could result in the degradation of the physical properties of the truss.

The particular type of tubing precursor material used in the method of the present invention will depend on the ultimate end use of the lined and/or wrapped tube. For instance, where the tube is to be used as a conduit or container for fluids, and the weight of the tube is not particularly critical, materials such as thermoplastic resins and thermoset resins may be used as the tubing precursor material. In other applications, such as support trusses in space stations, where strength and weight are prime concerns, the tubing precursor materials may be chosen from such materials as fiber reinforced resins or other composite materials. A preferred type of fiber reinforced resin is a graphite reinforced epoxy resin that includes plies of graphite fibers impregnated with an epoxy resin. The epoxy resins are generally thermosettable resins that in a partially cured state are flexible and when fully cured provide structural rigidness to the tubes. Where the preferred graphite reinforced epoxy resin is chosen as the tubing precursor material, the tube is preferably comprised of multiple layers of the graphite reinforced epoxy resin.

The lining or wrapping materials are chosen from materials that provide the desired protective, decorative or strengthening layer on the inside or outside of the tube. The particular properties desired in the lining or wrapping material will be determined by the type of environment in which the tube is to be used. Examples of lining and wrapping materials include metal foils. In the example of a space environment, because the weight of the tubular structure and the resistance of the lining or wrapping material to environmental factors are prime considerations, the material chosen as the lining or wrapping material is preferably a metal foil. An example of a suitable metal foil is an aluminum foil that generally exhibits a semi-hard or hard temper and provides a protective layer that is resistant to and protects the underlying tube from low earth orbital environmental factors such as atomic oxygen, charged particle radiation, ultraviolet radiation, micrometeoroids, and space debris. The metal foil also prevents moisture absorption/desorption of the tube and provides a thermal control coating. In the space environment, a preferred metal foil is an anodized aluminum foil. The aluminum foil is preferably anodized in order to improve its bonding strength as well as to provide optical properties that minimize the effect of the temperature cycling of the tubes resulting when the space structure passes through the Earth's shadow. The aluminum foil may be anodized by methods that are well-known in the art. The thickness of the preferred metal foil is not critical to the method of the present invention, however in particular applications where weight is a concern, such as tubular trusses to be used in space stations, the thickness of the foil preferably ranges from about 0.002 inches to about 0.006 inches. Other lining or wrapping materials of greater thicknesses may be more appropriate for other applications. It should be understood that the particular lining and wrapping materials applied to the interior and the exterior of an individual tube do not need to be the same or even similar materials. In fact, in certain applications where the interior and exterior of the tube are exposed to differing environments, it may be advantageous to use different materials.

The present invention is now described as it relates to the lining of the inside of a tube. It is understood that the lined tube prepared in accordance with the method of the present invention can also be used in the embodiment of the present invention wherein the exterior of a tubular structure, e.g., the lined tube, is wrapped with a wrapping material.

Figure 2:
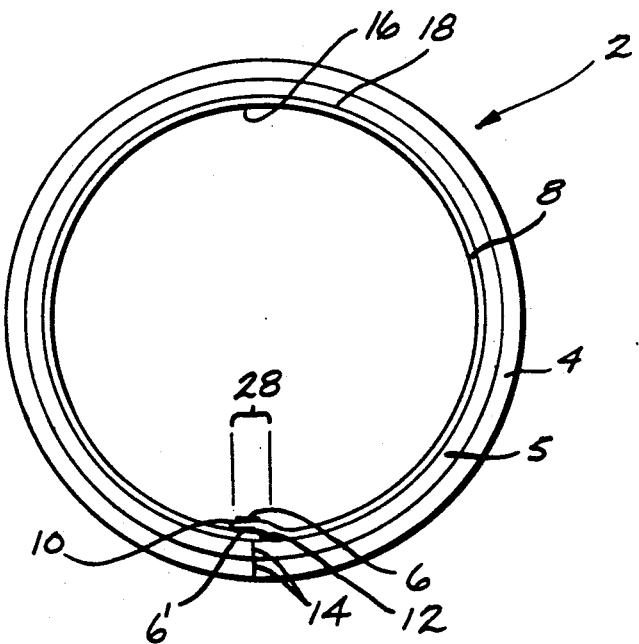
FIG. 2 is an elevational view of the end of the lined tube illustrated in FIG. 1.

Referring to FIGS. 1 and 2, the tube 2, having a circular cross section, includes the lining material 8 on its innermost surface. The lining material 8 includes an inner primary surface 16 and an outer secondary surface 18, and is concentrically surrounded by an adhesive layer 5 and the preferred graphite reinforced epoxy resin tubing precursor material 4 that have been subjected to curing conditions. The tubing precursor material 4 is sealed around the lining material 8 by the adhesive layer 5 and butt seam 14 that longitudinally runs the length of the tube 2. Adjacent the butt seam 14 and interior to the adhesive layer 5 and the tubing precursor material 4 is an overlap 28 of the first end 10 of the lining material 8 and the second end 12 of the lining material 8. The overlap 28 runs parallel to the longitudinal axis of the tube 2 and the butt seam 14. Although the tube 2 is illustrated as having a circular cross section, it is within the scope of the present invention to line tubes having cross sections that are not circular.

Figure 5:
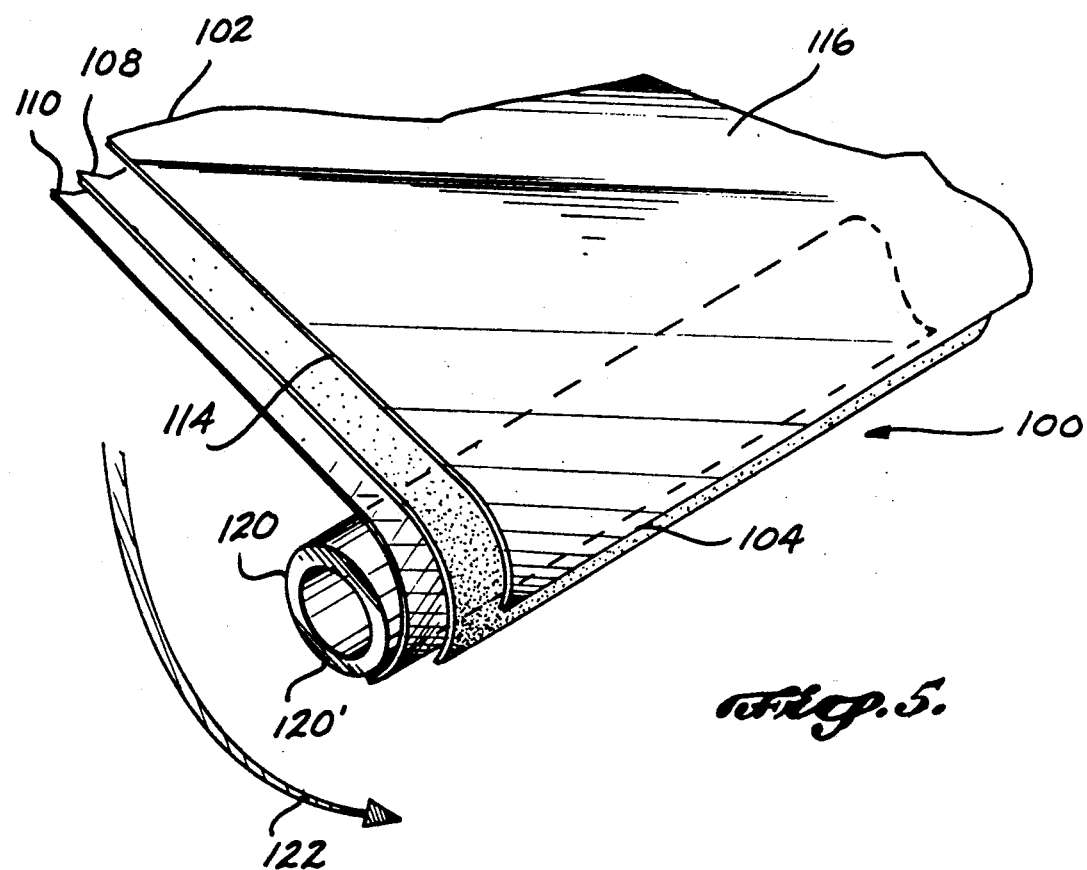
FIG. 5 is a schematic, isometric view illustrating the method of lining a tube in accordance with the method of the present invention.

A technique for making tube 2 in accordance with the present invention is illustrated in FIG. 5. The technique makes use of cylindrical support (mandrel) 20 that provides the base around which the lining material 8, adhesive layer 5 and tubing precursor material 4 are wrapped in a counterclockwise direction of arrow 26 to form the tube 2. Although only one ply of the tubing precursor material 4 is shown, multiple plies are equally applicable in the method of the present invention. The support 20 includes an elongate body and, although a support 20 having a circular cross section is generally preferred in order to provide a tube 2 having a circular cross section, the present invention is not so limited and other shapes of support 20 may be used depending on the desired cross-sectional shape of the tube 2. A particular example of a support 20 is a mandrel. The mandrel typically is a metal bar, that is not adversely effected by the curing conditions applied to the tubing precursor material 4 and the adhesive compositions 6 and 6'.

An adhesive composition 6 is used to anchor the first end 10 of the lining material 8 to the support 20. Adhesive composition 6 is generally of the type that is curable by heat and is tacky in an uncured or partially cured state. It is important that the adhesive 6 be tacky prior to complete curing so that the first end 10 of the lining material 8 can be anchored to the support 20 prior to wrapping the lining material 8 around the support 20. The adhesive bond provided by the adhesive 6 between the support 20 and lining material 8 must be sufficient to prevent the first end 10 of the lining material 8 from becoming detached from the support 20 while the lining material 8 is being wrapped around the support 20. If the adhesive 6 does not provide a bond of adequate strength, the lining material 8 will detach from its fixed position on the support 20 and result in an uneven lining or discontinuous lining on the inside of the tube 2. The adhesive composition 6 is of the type that when cured, it will release the support 20, thereby allowing the support 20 to be easily removed from the open ends of the tube 2. Preferably, where the tubing precursor material is a graphite/epoxy material, the adhesive composition 6 and the adhesive layer 5 are of the same composition as the epoxy component. This ensures that when the tubing precursor material is subjected to curing conditions, the adhesive 6 and adhesive layer 5 will cure also, thus avoiding any compatibility problems that may arise when using different compositions. It is within the scope of the present invention to thin the adhesive 6 with a solvent prior to application to facilitate its application by hand or aerosol spray. The release of the support 20 by the adhesive composition 6 can be enhanced by using a release agent 30 applied to the surface of the support 20 prior to contacting the support 20 with the adhesive composition 6.

The release agent 30 applied to the surface of the support 20 cooperates with the lining material 8 and the adhesive 6 to allow the adhesive 6 in its cured state to release the support 20 as well as to facilitate the removal of the support 20 from the ends of tube 2. However, the release agent 30 should not hinder the bond created between the support 20 and the lining material 8 by the adhesive 6 in its tacky uncured or partially cured state. The release agents 30 are generally lubricants such as waxes, silicone oils or liquified Teflon®, available under the trade name Frekote® from HYSOL. The amount of the release agent 30 applied is generally not critical to the practice of the present invention, however, the amount should be sufficient to allow easy removal of the support 20 from the tube 2.

Still referring to FIG. 5, the lining material 8 is anchored to the support 20 using several alternative methods. In order to completely line the tube 2, the support 20 must be completely wrapped in the lining material 8. It is preferred that the method of anchoring the lining material 8 to the support 20 result in the first end 10 of the lining material 8 being parallel to the longitudinal axis of the support 20. This insures that the support 20 can be concentrically wrapped with lining material 8 having a length slightly greater than the outer diameter of the support 20. If the first end 10 of the lining material 8 is not parallel to the longitudinal axis of the support 20, the support 20 is spirally wrapped with an excessive amount of lining material 8 having a length substantially greater than the outer diameter of the support 20.

The adhesive composition 6 is preferably applied as a narrow strip on the surface of the support 20 parallel to its longitudinal axis or along the primary surface 16 of the first end 10 of the lining material 8. Depending on whether the adhesive composition 6 is applied to the support 20 or the lining material 8, the other surface, i.e., the lining material 8 or the support 20 is brought into contact with the adhesive composition 6, thus anchoring the lining material 8 to the support 20. The release agent 30 should be applied to the support 20 prior to applying the adhesive composition 6 to the support 20 or prior to contacting the support 20 with the adhesive composition 6 on the lining material 8.

Still referring to FIGS. 1, 2 and 5, once the first end 10 of the lining material 8 is anchored to the support 20, the lining material 8 is wrapped at least once around the support 20, in a counterclockwise direction as indicated by arrow 26, to insure an overlap 28 of the anchored first end 10 of the lining material 8 by the second end 12 of the lining material 8. Although the overlap 28 is necessary to provide a surface for anchoring the first end 10 of the lining material 8 to the second end 12 of the lining material 8, in order to minimize the amount of lining material 8 used, it is preferred that the overlap 28 be limited to an amount necessary to provide an adequate bond between the secondary surface 18 of the first end 10 and the primary surface 16 of the second end 12 of the lining material 8. It is preferred that the second end 12 overlap the first end 10 by at least about 0.5 inches. The lining material 8 is preferably wrapped around the support 20 concentrically, such that the first end 10 of the lining material 8 is uniformly overlapped by the second end 12 of the lining material 8 along the length of the tube 2. In order to minimize the amount of lining material 8 used and to prevent wrinkling of the lining, the lining material 8 should be wrapped around the support 20 as tautly as possible using for example, a rolling table, and taking into consideration the strength of the bond provided by the adhesive 6 and the tensile strength of the lining material 8.

The lining material 8 after being wrapped around the support 20 is secured in place by anchoring the primary surface 16 of the second end 12 of the lining material 8 to the underlying secondary surface 18 of the lining material 8 using the adhesive composition 6' similar to the adhesive 6 described above. The adhesive composition 6' is applied to the underlying secondary surface 18 of the lining material 8 followed by contacting the primary surface 16 of the second end 12 of the lining material 8 with the adhesive composition 6'. Alternatively, the adhesive composition 6' is applied to the primary surface 16 of the second end 12 of the lining material 8 followed by contacting the underlying secondary surface 18 of the lining material 8 with the adhesive composition 6'. The adhesive composition 6' is preferably applied to either surface 16 or 18 of the lining material 8 as a narrow strip that will provide an adhesive layer in the overlapping space between the lining material 8 and the second end 12 of the lining material 8.

Anchoring the lining material 8 around the support 20 serves to maintain the lining material 8 in place on the support 20 prior to wrapping the adhesive layer 5 and tubing precursor material 4 around the lining material 8. Because of its semi-hard or hard temper, the lining material 8 will tend to pull away from the support 20 after being wrapped around the support 20. The adhesive compositions 6 and 6' serve to anchor the lining material 8 around the support 20 and provide the bond strength necessary to maintain the lining material 8 in position.

First, the adhesive layer 5 and then the tubing precursor material 4 are wrapped around the anchored lining material 8 in a concentric manner similar to the way the lining material 8 is wrapped around the support 20. It is also possible to wrap the tubing of precursor material 4 around the adhesive layer 5 in a spiral manner at a predetermined angle. The first and second ends of the adhesive layer 5 and the tubing precursor material 4 are abutted to each other to form a butt seam 14 rather than overlapping and anchoring the ends as was done with the lining material 8. Because the tubing precursor material 4 is preferably a flexible material prior to curing, it is easily wrapped around the support 20. Further, because the tubing precursor material 4 is less resilient to deformation compared to the lining material 8 and the adhesive layer 5 is preferably tacky prior to curing, the two layers cooperate to hold the tubing precursor material 4 in place prior to curing.

After the adhesive layer 5 and tubing precursor material 4 have been wrapped around the lining material 8 and the support 20, the adhesive layer 5, the tubing precursor material 4, adhesive compositions 6 and 6', support 20, and lining material 8, are subjected to curing conditions in order to cure the adhesive layer 5, tubing precursor material 4 and the adhesive compositions 6 and 6'. Prior to curing, it is desirable to remove any air pockets between the support 20, lining material 8, adhesive layer 5 and the tubing precursor material 4. The air pockets can be removed by conventional means such as vacuum bagging the structure prior to subjecting it to curing conditions. The curing conditions can include heat conditions, radiation conditions, chemical conditions, and the like that are well known in the art. Preferably, in the context of the present invention, the curing conditions employ heat and pressure. An example of a particular type of curing process involves placing the adhesive layer 5, tubing precursor material 4, adhesive compositions 6 and 6', support 20, and lining material 8 in an autoclave at an elevated temperature.

The curing conditions are applied to the structure for a period of time sufficient to completely cure the adhesive layer 5, tubing precursor material 4 and the adhesive compositions 6 and 6'. The complete curing of the adhesive layer 5 and the tubing precursor material 4 generally results in a lined rigid sealed tube with open ends for removing the support; however, it is possible that the fully cured tubing precursor material 4 may be flexible depending on its composition. During the curing process, the adhesive layer 5 bonds the lining material 8 to the tubing precursor material 4 and the adhesive composition 6 loses its adhesive property either independently or in conjunction with the release agent 30, and as a consequence the bond between the lining material 8 and the support means 20 is released. This release allows the support 20 to be easily removed from the open ends of the cured tube 2. In order to facilitate the removal of the support 20 from the interior of the tube 2 without damaging the lining material 8 or the tube 2, the surface of the support 20 is preferably smooth. If the support 20 has an uneven surface, for instance, indentations, the lining material 8 may become embedded in the indentations and therefore be damaged when the support 20 is removed. The interior surface of the cured tube when the mandrel is removed has a constant inner diameter, i.e., the increased thickness where the foil is overlapped is accommodated when the tubing precursor material flows during curing.

The method of lining the interior of a tube in accordance with the present invention provides substantially rigid tubes of varying lengths and diameters that are lined on the interior with a material that protects the underlying tubing composition from harmful environmental conditions. Although the lining material serves to protect the interior of the tube from exposure to adverse environmental conditions, it does nothing to protect the exterior of the tube from exposure to the same types of conditions. Therefore, in order to completely protect the underlying tubing material and further strengthen the tube, it is advantageous to wrap the exterior of the tube in a material similar to that used to line the tube.

Figure 3:
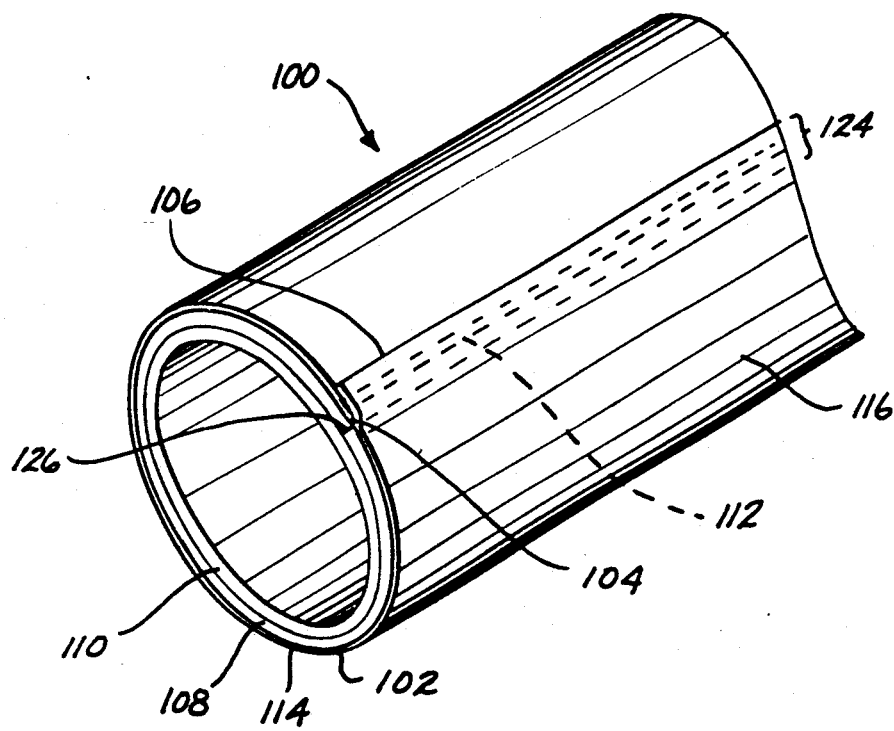
FIG. 3 is an isometric view of a wrapped support prepared in accordance with the method of the present invention.
Figure 4:
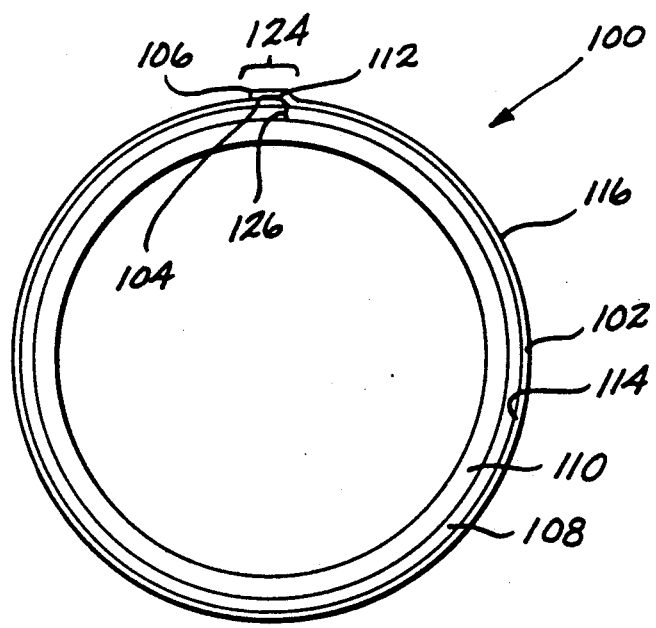
FIG. 4 is an elevational view of the end of the wrapped support illustrated in FIG. 3.

Referring to FIGS. 3 and 4, tube 100 comprises a cured or uncured tubing precursor material 110 concentrically wrapped by a layer of an adhesive composition 108, which in turn is concentrically wrapped by a wrapping material 102. On the exterior secondary surface 116 of the wrapping material 102 is a longitudinal overlap 124 wherein the first end 104 of the wrapping material 102 is overlapped by the second end 106 of the wrapping material 102. The overlap 124 extends the length of the tube 100 and is parallel to the longitudinal axis of the support (120 in FIG. 6). The secondary surface 116 of the first end 104 is sealed to the primary surface 114 of the second end 106 of the wrapping material 102 by a weld 112 that extends parallel to the length of the overlap 124.

Figure 6:
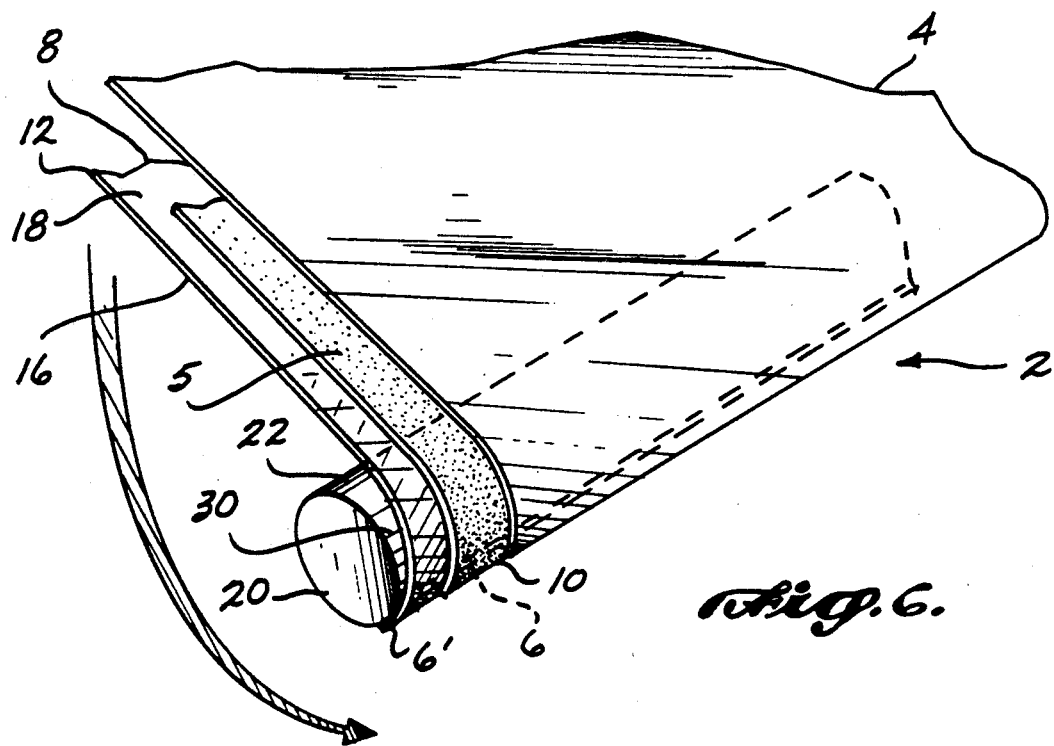
FIG. 6 is a schematic, isometric view illustrating the method of wrapping a support in accordance with the method of the present invention.

Referring primarily to FIG. 6, in the following discussion, it is assumed that the support 120 has been preformed and, therefore, the illustrated tubing precursor material 110' is not necessary to provide the support 120. However, it should be understood that any reference to the support 120 is intended to encompass a support 120 that includes an independent support 120' surrounded by the tubing precursor material 110'.

In a preferred method of making tube 100 in accordance with the present invention, the same or similar materials are used as the wrapping material 102, tubing precursor material 110 and adhesive composition 108, as were used with regard to the lining of the interior of the tube 2 in FIG. 5. The method makes use of support 120 that includes a preformed tube or the method may be used in conjunction with the initial production of a tube. The preformed tube may be lined and prepared in accordance with the present invention, or it may be lined or unlined and prepared by other methods. When a preformed tube is used, the preformed tube forms the support 120 around which the adhesive 108 and wrapping material 102 are supported. When wrapping the exterior of a tube in conjunction with the initial production of the tube, the independent support 120' must be provided around which the optional lining material 8 in FIG. 1 and the flexible tubing precursor material 110' are wrapped to provide the support 120. When the independent support 120' is used, the lining material 8 can be provided in accordance with the present invention, although the lining material 8 is not required. Although round tubes are the preferred examples of the support 120, other structures having cross sections that are not circular or solid structures can be used in the wrapping embodiment of the present invention.

Still referring to FIG. 6, the support 120 is concentrically wrapped in a counterclockwise direction of arrow 122 by a layer of adhesive composition 108, followed by a layer of wrapping material 102. The adhesive composition 108 is preferably in the form of a thin sheet that has substantially the same dimensions as the wrapping material 102. However, as will be discussed more fully hereinbelow, it is preferred that the sheet of adhesive composition 108 not cover the primary surface 114 of the second end 106 of the wrapping material 102. In order to anchor the wrapping material 102 to the support 120, the adhesive composition 108 is applied to the surface of the support 120 or preferably the interior primary surface 114 of the wrapping material 102 followed by contacting either the wrapping material 102 or support 120 with the adhesive composition 108. As with the anchoring of the lining material to the support 20 in FIG. 5, it is preferred that the wrapping material 102 be applied to the support 120 so that the first end 104 of the wrapping material 102 is parallel to the longitudinal axis of the support 120, thus insuring that a minimal amount of wrapping material 102 is used to completely wrap the support 120.

After the first end 104 of the wrapping material 102 is anchored to the support 120, the balance of the wrapping material 102 is anchored to the support 120 by concentrically wrapping the wrapping material 102 having the adhesive composition 108 applied to it at least once around the support 120 in the direction of arrow 122. The length of the wrapping material 102 should be sufficient so that the first end 104 is overlapped by the second end 106. Preferably, the wrapping material 102 has a length in the direction of wrapping (arrow 122) that is at least 0.5 inches greater than the length of the sheet of adhesive composition 108 in the same direction. The length of the layer of adhesive composition 108 is preferably equal to the outer diameter of the support 120 around which the adhesive layer 108 is wrapped.

In order to provide direct contact between the overlapping portions of the first 104 and the second 106 (in FIGS. 3 and 4) ends of the wrapping material 102, it is preferred that the adhesive composition 108 be applied so that it does not cover the primary surface 114 of the second end 106 of the wrapping material 102. This ensures that adhesive composition 108 will be present adjacent the overlap 124 of the first 104 and second 106 ends of the wrapping material 102 and provide the bond necessary to anchor the wrapping material 102 proximate its second end 106 to the support 120; however, the adhesive composition 108 will not be present in the overlap 124. If the adhesive composition 108 is applied to the entire primary surface 114 of the wrapping material 102, the overlap 124 (in FIGS. 3 and 4) between the first end 104 and the second end 106 will contain a portion of the adhesive composition 108 that must be removed to provide the direct contact between the first 104 and second 106 ends of the wrapping material 102. It is desired that the first end 104 and the second end 106 of the wrapping material 102 directly contact each other so they can be satisfactorily welded to each other as discussed hereinbelow. Likewise, if the adhesive composition 108 is applied to the surface of the support 120, any adhesive 108 that ends up in the overlap 124 between the first end 104 and the second end 106 of the wrapping material 102 should be removed prior to welding the surfaces together.

The method of anchoring the wrapping material 102 to the support 120 is best understood by referring to FIG. 4. The layer of adhesive composition 108 is applied to the primary surface 114 of the wrapping material 102 at the first end 104 and completely lines the wrapping material 102 up to adhesive joint 126 proximate the second end 106 of the wrapping material 102. The second end 106 of the wrapping material 102 is substantially free of adhesive composition 108 and directly overlaps the first end 104 because of the greater length of the wrapping material 102 compared to the length of the adhesive layer 108. If a length of the adhesive layer 108 greater than the outer diameter of the support 120 is applied to the wrapping material 102, the adhesive composition 108 would occupy at least a portion of the overlap 124 between the first end 104 and the second end 106, thus requiring removal to avoid hindering the weld 112.

Prior to curing or after curing the adhesive composition 108 and, if necessary, the support 120, the overlapping portion 124 of the first 104 and second 106 ends of the wrapping material 102 are ultrasonically welded together. The ultrasonic weld 112 provides a seal that unlike seals provided by conventional adhesives such as epoxy resins is highly resistant to degradation caused by exposure to environmental conditions, particularly low earth orbital conditions. The secondary surface 116 of the overlapping portion 124 is contacted with an ultrasonic welder that is operated at a frequency that serves to break up the naturally occurring oxide layer that is present on the surface of the preferred wrapping materials 102 thus allowing a metallurgical bond to form. In order to break up the oxide layer and allow the weld to take place, the frequency used is preferably about 50,000 Hz, although other frequencies will be applicable depending on the particular materials used and the other welding parameters. The other weld parameters such as weld head to tube contact force, translational weld head speed, and ultrasonic energy amplitude can be optimized to provide a weld 112 of optimal strength without causing damage to the support 120 or the wrapping material 102. Preferably, the first end 104 and the second end 106 of the wrapping material 102 are welded to each other prior to the curing step to insure that the adhesive composition 108 does not come between the first 104 and second 106 ends during the curing process and thus hinder the subsequent formation of the weld 112. Although the welding step is preferably done prior to the curing step, it is also possible that the weld 112 can be formed after the curing process is complete, as long as any residual adhesive 108 is removed from the overlap 124 between the first end 104 and second end 106 of the wrapping material 102 prior to the welding step.

Prior to or preferably after the welding step, the support 120, adhesive composition 108, and wrapping material 102 are subjected to curing conditions. Preferably, the entire assembly is subjected to vacuum bag conditions prior to curing to remove any air pockets between adjacent layers that may cause discontinuities or other flaws in the adhesion between the various layers of materials. The curing conditions are effective to cure the adhesive composition 108 and optionally any of the other materials which have not already been cured prior to the present curing step. These optional uncured materials may include the adhesive composition 6 and 6' in FIGS. 1 and 2 and the tubing precursor material 110'. If the support 120 includes the independent support 120' and the tubing precursor material 110' it will be necessary to remove the independent support 120' from the tube 100. After the curing conditions are complete, the wrapped and optionally lined tube 100 has a protective layer 102 that is sealed around it in a manner that prevents environmental conditions from penetrating the seal and causing significant degradation of the underlying tubing material.

The method of lining and wrapping the interior and exterior of a tube in accordance with the present invention provides lined tubes, wrapped tubes, lined and wrapped tubes, and any other combinations thereof. It is understood that the method of lining and wrapping the tube can be employed either independently or conjunctively to provide any of the above combinations.

While the present invention has been described in conjunction with the preferred embodiments, one of ordinary skill after reading the foregoing specification will be able to effect various changes, substitution of equivalents and other alterations disclosed or set forth herein. It is therefore intended that the protection granted by letters patent thereon be limited only by the definition contained in the appending claims and equivalent thereof.

The embodiments of the invention in which an exclusive property or privilege is claimed are defined as follows:

1. A tubular structure, comprising:
    a tubular body having a longitudinal axis, a first end and a second end opposite the first end;
    an inner metal foil liner convolutely disposed around the inside surface of said tubular body, said metal foil liner having two opposing edges each extending from the first end to the second end of said tubular body, said edges being overlapped and attached together with an adhesive composition, said tubular body made of composite material having reinforcing fibers in a resin matrix disposed around said metal foil liner without overlap, said composite material being bonded to said metal foil liner with an adhesive material disposed between said metal foil liner and the composite material;
    a metal foil wrapping material convolutely disposed around said tubular body and having two opposing ends each extending from the first end to the second end of the tubular body, said opposing ends being overlapped and ultrasonically welded;
    whereby said tubular body is sealed on the inside and outside surfaces with metal foil against hostile environmental influences and against evaporative loss of volatiles from the composite material.

2. The tubular structure of claim 1, wherein the inner metal foil liner is aluminum foil.

3. The tubular structure of claim 1, wherein said adhesive composition comprises an epoxy resin.

4. The tubular structure of claim 1, wherein the edges of said metal foil are overlapped at least about 0.5 inches.

5. The tubular structure of claim 1, wherein said resin matrix comprises an epoxy resin.

6. The tubular structure of claim 1, wherein said reinforcing fibers are graphite fibers.

7. The tubular structure of claim 1, wherein said adhesive composition and said resin matrix comprise the same thermally curable material.

8. A tubular structure having a longitudinal aixs, a first end and a second opposite the first end, the tubular structure line with a metal foil lining material having a first edge, and a second edge opposite the first edge, each edge extending from the first end to the second end of the tubular structure, the tubular structure produced by a method comprising the steps:
    (a) anchoring the first edge of said lining material to a support means using an adhesive composition;
    (b) convolutely wrapping said lining material at least once around the support means;
    (c) anchoring the second edge of said lining material to the lining material;
    (d) convolutely wrapping an adhesive material around the anchored lining material;
    (e) convolutely wrapping a tubing precursor material which comprises a matrix of reinforcing fibers around the adhesive material the matrix of tubing precursor material having two opposing ends each extending between the first end and the second end of the tubular structure, and butting the ends of said matrix of said precursor material together without overlap; and
    (f) subjecting the support means, lining material, adhesive material and tubing precursor material to curing conditions to cure said adhesive material and said tubing precursor material.

9. The tubular structure provided by steps (a)-(e) of claim 8, wherein said tubular structure is wrapped by a wrapping material having a first end, and a second end opposite the first end, each end extending from the first end to the second end of the tubular structure, said wrapping material being applied to the tubular structure by the steps:

(g) anchoring the first end of said wrapping material to the tubular structure using an adhesive composition;

(h) wrapping said wrapping material at least once around the tubular structure;

(i) anchoring said wrapping material adjacent its second end to the tubular structure;

(j) welding the second end of said wrapping material to said wrapping material proximate the first end of said wrapping material; and (k) subjecting the support means, lining material, adhesive material, tubing precursor material, and wrapping material to curing conditions to cure said adhesive material and tubing precursor material.

10. The tubular structure of claim 8, wherein said metal foil lining material is aluminum foil.

11. The tubular structure of claim 9, wherein said wrapping material is a metal foil.

12. The tubular structure of claim 11, wherein said metal foil is aluminum foil.

13. The tubular structure of claim 9, wherein said adhesive composition comprises an epoxy resin.

14. The tubular structure of claim 9, wherein said resin matrix comprises an epoxy resin.

15. The tubular structure of claim 9, wherein said reinforcing fibers are graphite fibers.

16. The tubular structure of claim 9, wherein said adhesive composition and said resin matrix comprise the same thermally curable material.

17. The tubular structure of claim 2, wherein the aluminum foil is anodized.

18. The tubular structure of claim 10, wherein the aluminum foil is anodized.

19. The tubular structure of claim 12, wherein the aluminum foil is anodized.

20. The tubular structure of claim 1, wherein the hostile environmental influences are selected from the group of low earth orbital environmental factors consisting of atomic oxygen, charged particle radiation, ultraviolet radiation, micrometeoroids, and space debris.

* * * * *

UNITED STATES PATENT AND TRADEMARK OFFICE
CERTIFICATE OF CORRECTION

PATENT NO. : 5,077,106
DATED : December 31, 1991
INVENTOR(S) : H.W. Dursch et al.

It is certified that error appears in the above-identified patent and that said Letters Patent is hereby corrected as shown below:

| COLUMN | LINE | |
|---|---|---|
| 12 (Claim 6, Line 1) | 33 | "Claim 1" should be --Claim 5-- |
| 12 (Claim 8, Line 1) | 38 | "aixs" should be --axis-- |
| 12 (Claim 8, Line 3) | 40 | "line" should be --lined-- |

Signed and Sealed this

First Day of June, 1993

Attest:

MICHAEL K. KIRK

Attesting Officer     Acting Commissioner of Patents and Trademarks